United States Patent [19]

Nordin

[11] 4,198,749
[45] Apr. 22, 1980

[54] HAND OPERATED CUTTING TOOL

[75] Inventor: Fred W. Nordin, Orangeburg, S.C.

[73] Assignee: Utica Tool Company, Inc., Orangeburg, S.C.

[21] Appl. No.: 893,703

[22] Filed: Apr. 5, 1978

[51] Int. Cl.² ............................................. B26B 17/02
[52] U.S. Cl. ........................................ 30/192; 30/122
[58] Field of Search ................. 30/191, 192, 193, 122

[56] References Cited

U.S. PATENT DOCUMENTS

| 232,975 | 10/1880 | Johnson | 30/192 |
|---|---|---|---|
| 1,455,297 | 5/1923 | Lyons | 30/192 |
| 3,372,480 | 3/1968 | Rozmus | 30/193 |
| 3,680,212 | 8/1972 | Rozmus | 30/191 |

Primary Examiner—Jimmy C. Peters
Attorney, Agent, or Firm—Harness, Dickey & Pierce

[57] ABSTRACT

Mechanical or hydraulic press stampings are widely used for a manufactured product as thin material may be accurately blanked thereon so that only a minor amount of expensive machining is required. A compound pivot plier-type tool is provided wherein a pair of handles is pivotally mounted on and between a pair of plates which form a recess for the reception of a selected pair of jaws which are mounted therein by removable means so that a kit can be furnished with a pair of handles and mounting plates and several of the same or different types of pairs of jaws which may be easily substituted, one for the other in the recess between the plates for operation by the handles. The parts are relatively thin so that they may be largely formed by mechanical or hydraulic press stamping operations with resulting low labor costs.

11 Claims, 26 Drawing Figures

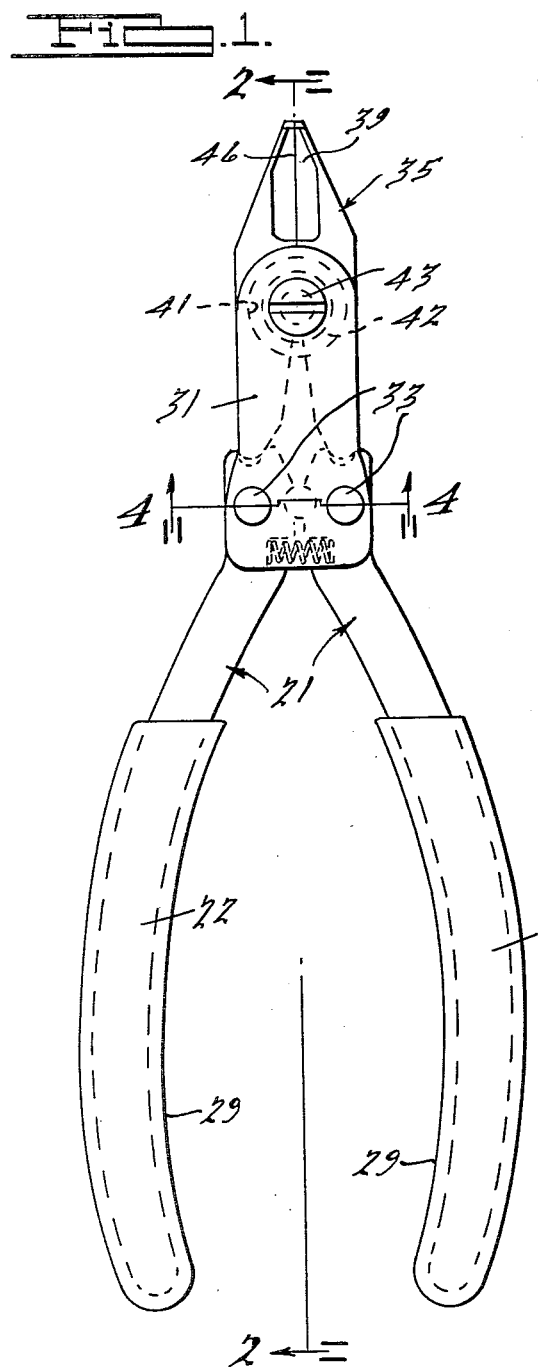
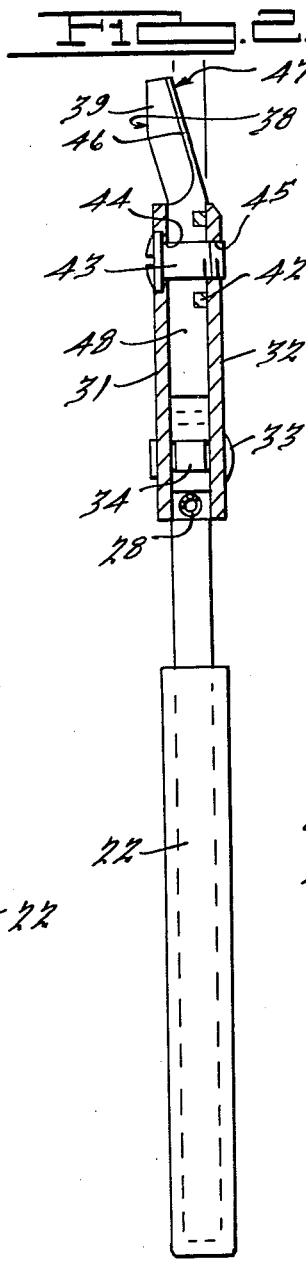
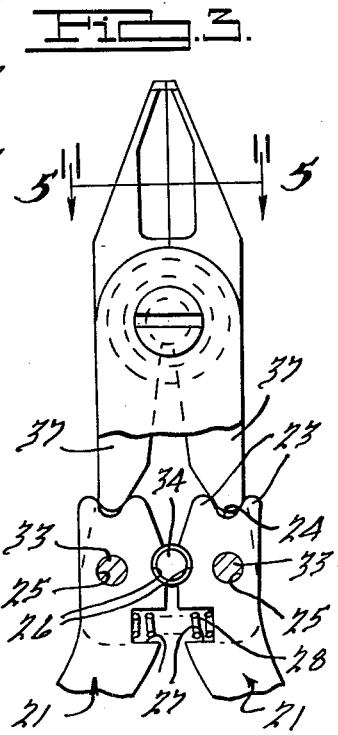
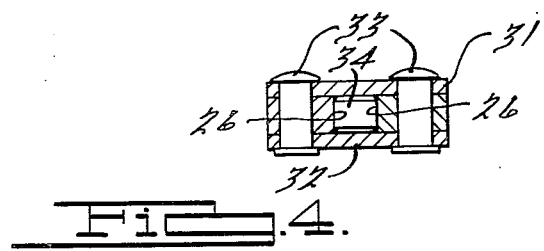
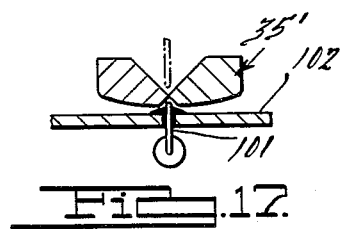
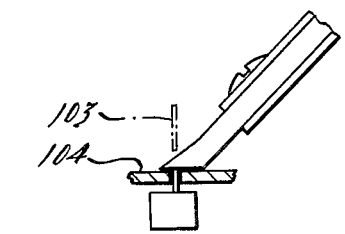

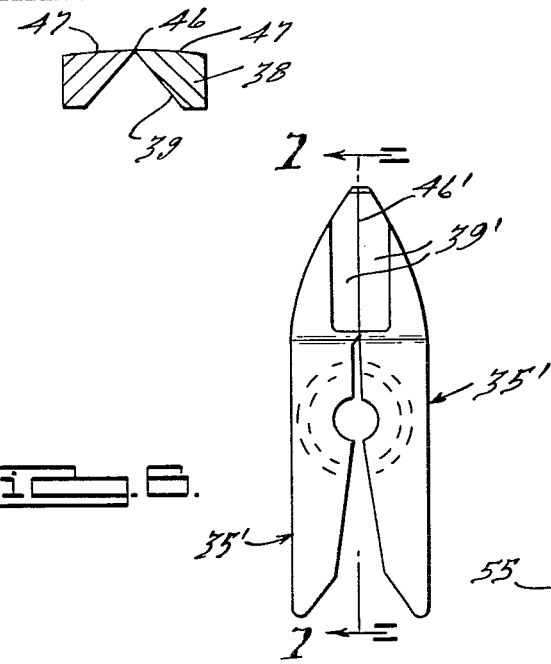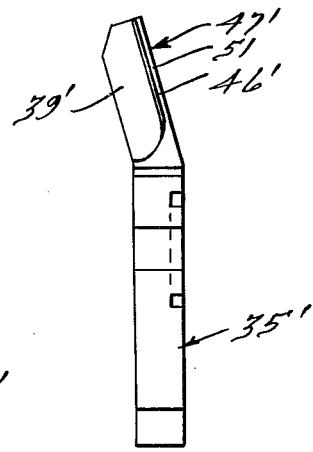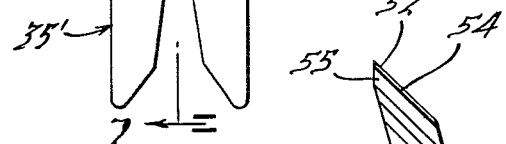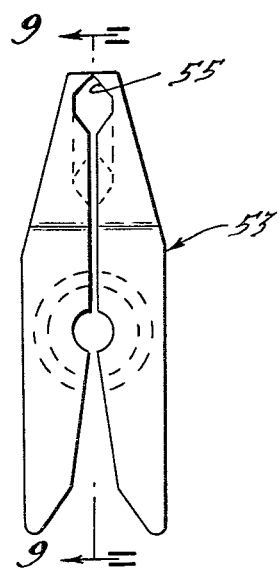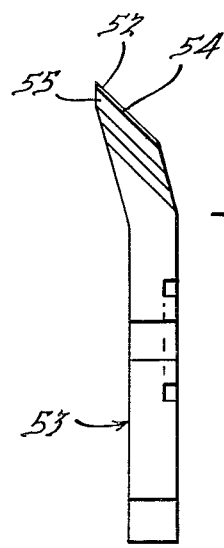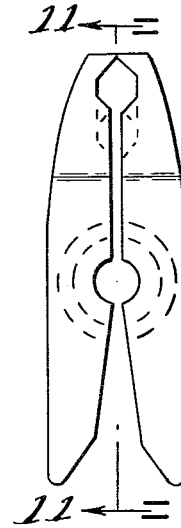

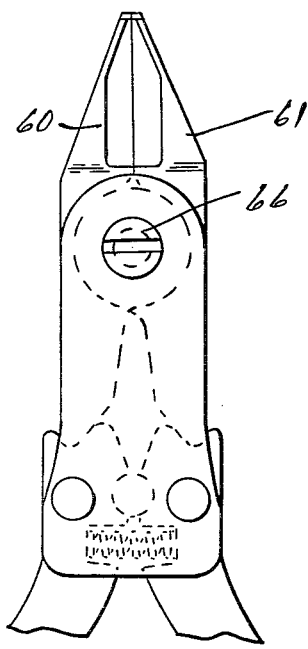
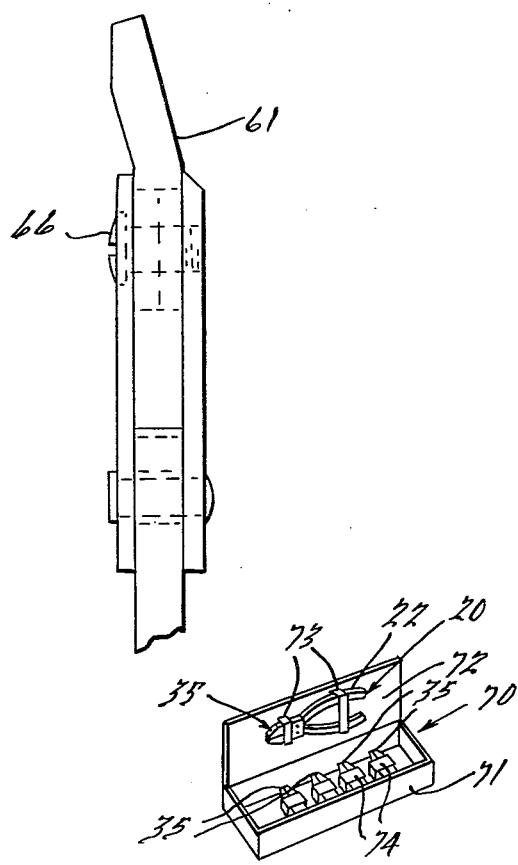
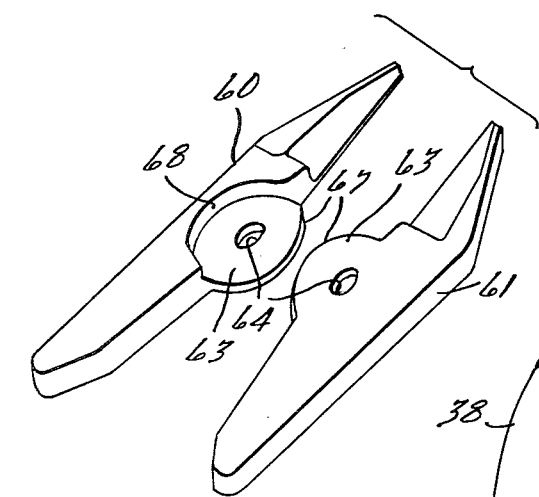
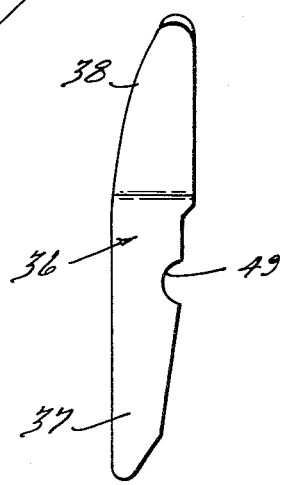
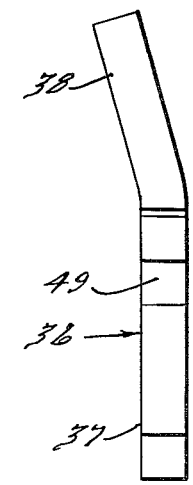

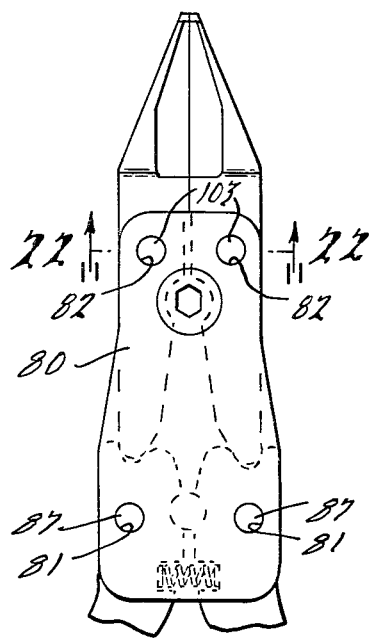
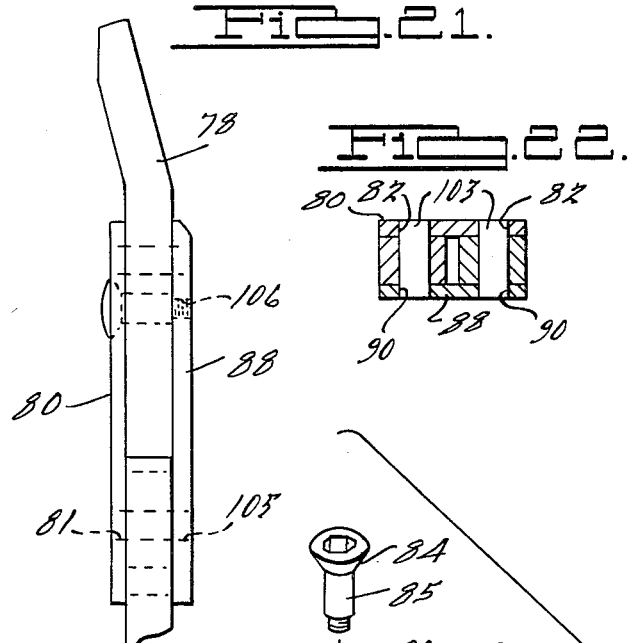
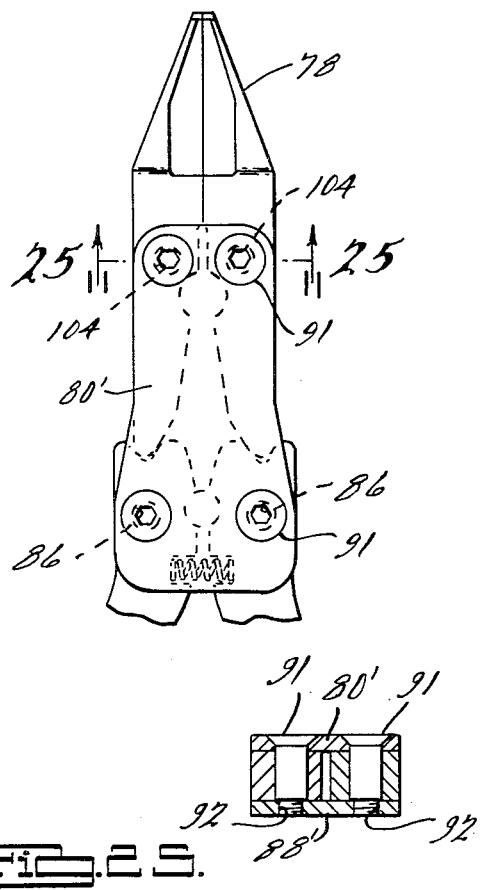
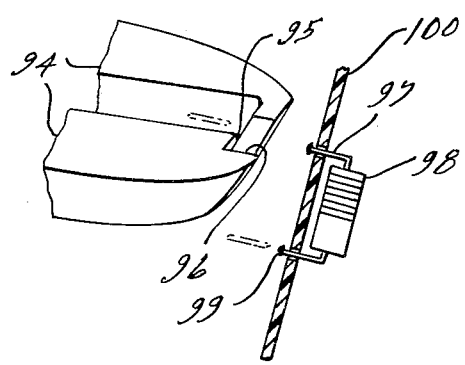

HAND OPERATED CUTTING TOOL

BACKGROUND OF THE INVENTION

Prior to the present invention it was known (see U.S. Pat. No. 3,680,212) to provide a plier having a similar compound pivot action in which the handles and a single pair of jaws were permanently mounted between a pair of plates. Thus a complete new plier was required when different jaws were desired either because of wear or damage or because jaws of a different configuration were required for the job to be done.

SUMMARY OF THE INVENTION

The invention relates to an improved compound pivot plier-type tool having a pair of spaced mounting plates upon which a pair of handles are pivotally mounted adjacent one end of the plates and a pair of jaws are removably mounted between the plates for pivotal movement relative thereto, the handles and the jaws having interengaging portions so that operation of the handles actuates the jaws. It is a feature of the invention that the tool includes readily removable means upon the removal of which the pair of jaws may be readily removed from the tool. It is thus made possible to provide a kit including one pair of handles and one pair of mounting plates and a plurality of pairs of jaws which may be selectively mounted between the mounting plates, and readily removable means for holding a selected pair of jaws securely mounted between the plates. It is also a feature of the invention that the construction of the compound pivot plier-type tool of this invention lends itself to the use of relatively thin parts which may be made by mechanical or hydraulic press stamping thereby reducing to a minimum the machining operations and permitting manufacture by capital intensive methods rather than labor intensive processes. The two handles are the same and the same jaw blank may be used for the two jaws of each pair.

In the preferred embodiment the two jaws of each pair are connected for pivotal movement about a common axis by a single ring received in concentric arcuate grooves formed in the two jaws and the assembly of the two jaws and the ring is held removably mounted between the plates by a screw. It is also a feature of this embodiment of the invention that it is what is referred to as "fail safe" in that ring pivotally connecting jaws fails first on overload to avoid breaking of the jaws or other more expensive parts. In another embodiment, the jaws have a lap joint formed by overlapping interfitting portions having aligned apertures receiving the removable screw therethrough which removably mounts them between the plates. In a third embodiment each handle and each jaw carries a separate pivot pin and a removable screw holds the two plates with the four pins extending into them to pivotally mount the handles and jaws on the mounting plates. In another embodiment in place of the four pins, four screws are employed which both provide a pivotal connection and removably secure the plates together. In each of the embodiments there are cooperating force applying means on the handles and on the jaws which engage so that operation of the handles actuates the jaws.

BRIEF DESCRIPTION OF THE DRAWINGS

FIG. 1 is a plan view of a pair of pliers embodying features of the present invention having flush cutting jaws;

FIG. 2 is a sectional view of the structure illustrated in FIG. 1, taken on the line 2—2 thereof;

FIG. 3 is a broken plan view of the structure illustrated in FIG. 1, showing the engagement between the jaws and handles;

FIG. 4 is a sectional view of the structure illustrated in FIG. 1, taken on the line 4—4 thereof;

FIG. 5 is a sectional view of the structure illustrated in FIG. 3, taken on the line 5—5 thereof;

FIG. 6 is a view of a pair of jaws similar to those illustrated in FIG. 1, but for effecting semi-flush cutting;

FIG. 7 is a view of one of the jaws of FIG. 6 as viewed from line 7—7 thereof;

FIG. 8 is a view of a pair of jaws, similar to those illustrated in FIG. 1, showing another form of cutting edges;

FIG. 9 is a view of one of the jaws illustrated in FIG. 8, as viewed from the line 9—9 thereof;

FIG. 10 is a view of a pair of jaws, similar to those shown in FIG. 8, showing another form of cutting edge;

FIG. 11 is a view of one of the jaws illustrated in FIG. 10, as viewed from the line 11—11 thereof;

FIG. 12 is a broken plan view of a pair of pliers, similar to those illustrated in FIG. 1, showing another form of jaw;

FIG. 13 is a view in side elevation of the structure illustrated in FIG. 12;

FIG. 14 is an exploded view of the jaws illustrated in FIG. 12;

FIG. 15 is a plan view of a jaw blank which is formed in a press operation and bent;

FIG. 16 is a side elevational view of the jaw blank illustrated in FIG. 15;

FIG. 17 is a broken view of an electronic component which is inserted through apertures in a printed circuit board showing cutting the wire with the semi-flush cutting jaws of FIGS. 6–7;

FIG. 18 is a similar view to that of FIG. 17 showing a plier having the flush cutting jaws of FIGS. 8 and 9 cutting the leads on an electric component being applied to a printed circuit;

FIG. 19 is a view of a kit for holding a pair of pliers and a plurality of sets of jaws which are interchangeable in the pliers;

FIG. 20 is a broken view of structure, similar to that illustrated in FIG. 1, showing another form of the invention;

FIG. 21 is a side view of the structure illustrated in FIG. 20;

FIG. 22 is a sectional view of the structure illustrated in FIG. 20, taken on the line 22—22 thereof;

FIG. 23 is an exploded view of the structure illustrated in FIG. 20;

FIG. 24 is a view of structure, similar to that illustrated in FIG. 20, showing a still further form of the invention;

FIG. 25 is a sectional view of the structure illustrated in FIG. 24, taken on the line 25—25 thereof; and FIG. 26 is a view showing jaws which cut and crimp the leads of an electronic component which are inserted through apertures in a printed circuit board.

DESCRIPTION OF THE PREFERRED EMBODIMENTS

Referring to FIGS. 1-5, the preferred compound pivot plier-type tool there illustrated includes a pair of handles 21 which are the same and may be formed in a press operation. These handles have the outer handle portions 22 thereof which are adapted to be gripped by the user, covered with a plastisol coating indicated at 29. The inner end portions of the handles 21 are received between a pair of spaced parallel mounting plates 31 and 32 to which they are pivotally connected by rivets 33 extending through the mounting plates and through apertures 25 formed in the handles 21. At their inner ends the handles 21 each have a pair of spaced fingers or teeth 23 and a notch 24 therebetween for applying force to the jaws as hereinafter described. The adjacent faces of the handles 21 are provided with recesses 27 which cooperate to contain a compression spring 28 which urges the handles 21 to pivot about the rivets 33 so as to move the handle portions 22 apart. The adjacent surfaces of the handles 21 between the apertures 25 have arcuate surfaces 26 cooperating to contain therebetween a floating pivot pin 34.

In this preferred embodiment the plates 31 and 32 and the handles 21 are held permanently assembled by the rivets 33.

The plates 31 and 32 form a recess for the reception of a pair of plier jaws 35 which are made from two like blanks similar to the blanks 36, illustrated in FIGS. 15 and 16. It will be appreciated, however, that these figures show the cutting end 38 deformed through an angle, and that the opposite jaw cooperating with the one there illustrated will have the cutting end 38 deformed in the opposite direction through the same angle. Each blank 36 has an arcuate recess 49 formed therein and in the assembled position of the jaws 35 the recesses 49 cooperate to receive therebetween the screw 43 which extends through an aperture 44 in the plate 31 and threadedly engages in a tapped aperture 45 in the plate 32 to hold the plates and jaws in assembled relation.

In the finished machined jaw 35 (FIGS. 1, 2, 3 and 5) the cutting end 38 has a sloping face 39 machined thereon to produce a cutting edge 46. The two blanks 36 are placed in a fixture to be in exact cutting relation to each other and a circular recess 41 of square cross-section is machined therein. The recess 41 is accurately located on the common center of the recesses 49. The annular recess of square section receives a ring 42 of like square section which provides a center about which the two jaws operate. A screw 43 extends through a recessed aperture 44 on the top plate 31 and is screwed within a thread of an aperture 45 in the lower plate 32. The center of the apertures and the screw 43 are such as not to interfere with the operation of the jaws about the center formed by the ring 42.

The underfaces 47 of the jaws are formed on a large radius and in this embodiment the cutting edges 46 are disposed at the intersections of the sloping faces 39 with the surfaces 47 to provide flush cutting by the cutting edge 46. Each of the outer cutting ends 38 of the jaws 35 are bent upwardly at an angle of approximately 15°, as illustrated in FIGS. 2 and 16. In this relationship, one-half of the blanks 36 have the cutting end 38 bent upwardly while the other half have the end bent downwardly so that the cutting edge 46 on opposite jaws will be accurately aligned.

At its inner end each jaw 35 has a force applying finger 37 which extends into the notch 24 between the teeth 23 at the inner end of one of the handles 21 for producing the operation thereof. The teeth 23 of each handle 21 operate arcuately about the center of the rivet 33 and function as a pair of gear teeth which engage the fingers 37 of the jaws 35 to actuate the jaws 35. The arcuate movement of the teeth 23 causes the floating pin 34 to move slightly along the centerline of the plates 31 and 32 and at right angles to the line through the centers of the rivets 33. The pressure applied to the handles 22 is multiplied many times by the teeth 23 acting through the jaw fingers 37 when the handles 21 are moved toward each other to the closed position illustrated in FIG. 1.

It is an important feature of the present invention that by removably securing the pair of jaws 35 in the recess 48, a kit may be provided containing several of the same or different pairs of jaws which may be selectively and easily used in the tool. This is accomplished by removing the screw 43 and then the subassembly consisting of the pair of jaws 35 and the ring 42 may be readily removed and replaced by another such subassembly, either because the first jaws are worn or damaged or because jaws of a different type are desired.

In FIG. 19, such a kit 70 is illustrated embodying a container which may be a pouch of various constructions, but is herein illustrated as a box 71 with a hinged lid 72 made of metal, wood, plastic or the like. The lid 72 has supports 73 for mounting a tool 20 having handles 22 and a pair of jaws 35 which are removably mounted. Additional pairs of jaws 35 are removably retained in loops 74 secured at spaced points on the inner surface of the box 70. The tool and the assortment of jaws are carried in the kit to the site where the work is to be done so that the one of the pairs of jaws can be selected which best fits the work to be done.

It is also a feature of the present invention that a single ring 42 controls the movement of the jaws relative to each other enabling the use of a suitably thin material for the jaw blanks to permit the formation thereof by a mechanical or hydraulic press operation.

It will be appreciated that in these compound pivot-type pliers there is provided a substantial mechanical advantage which, for example, may be in the neighborhood of 10. This makes it possible for an operator to exert sufficient force to break the plier jaws 35. It is also a feature of the present invention that this is prevented and the pliers are made what is called "fail safe" by making the ring 42 of a cross-section such that it will break before the jaws 35 or other parts of the pliers more expensive than the ring 42, will break. It will be appreciated that when the handle portions 22 of the handles 21 are pressed toward each other by the operator and the cutting edges 46 of the jaws 35 engage a wire or other object to be cut, continued pressure on the handles 22 acting through the teeth 23 and the fingers 37 on the jaws 35, loads the ring 42 in tension. The cross-sectional size of the ring 42 is so selected that the ring 42 will fail in tension before the jaws 35 will break. The ring 42 thus protects the jaws and other more expensive parts in a manner analogous to that in which a shear pin protects a propeller.

FIGS. 6 and 7 show a pair of jaws 35' similar to the above described jaws 35 but differing therefrom in that the cutter has what is known as a semi-flush cutting edge 46' which is slightly spaced from the surface 47'. This is obtained by machining the narrow surface indicated at 51. This spacing of the cutting edge 46' from the surface 47' provides a strong cutting edge 46'. The use of these semi-flush cutting jaws 35' is somewhat diagrammatically illustrated in FIG. 17 showing the cutting of a wire 101 extending through a plate 102.

FIGS. 8 and 9 illustrate another jaw form in which the cutting edge 54 is disposed at a 45° angle to the plane of the main body of the jaw 53 which in assembled position is received in the recess 48 between the mounting plates 31 and 32 of the tool. These jaws provide a long, slim shape for reaching into areas of limited accessibility and provide for flush cutting because the cutting edge 54 is disposed at the intersection of the cutting face 55 and nose surface 52. The use of these 45° angle nose cutting jaws for flush cutting a wire 103 at a plate 104 is somewhat diagrammatically illustrated in FIG. 18.

The construction illustrated in FIGS. 10 and 11 differs from that illustrated in FIGS. 8 and 9 only in that cutting edge 56 of each jaw 57 is disposed at an angle of 60° to the main body of the jaw rather than 45°.

In FIGS. 12, 13 and 14 a slightly modified form of the invention is illustrated wherein a pair of jaws 60 and 61 are formed from blanks of like construction having central overlapping circular and recessed portions 63 having edge portions 67 interfitting with cylindrical portions 68 and containing apertures 64 which are aligned when the jaws are in assembled relation in the tool and receive screw 66 therethrough. In this arrangement, the centering ring 42 is omitted and the load on closing the jaws 60, 61 is taken on the pivot pin 66. The two jaws 60 and 61 are placed together with the apertures 64 in aligned relation and are held in place in the tool by a removable screw 66 operating the same as the above described screw 43. In other respects the jaws 60 and 61 are the same in construction and function as the jaws 35 described above. As in the case of the above jaws where their movement is controlled by the ring 42, these jaws 60 and 61 may be provided with any desired construction of cutting nose and cutting edge. Also, simply by the removal of the readily removable screw 66 these jaws 60 and 61 may be readily removed and another pair of jaws mounted in the tool.

Another embodiment of the invention is illustrated in FIGS. 20 to 23 and differs from the embodiment described above and illustrated in FIGS. 1 to 5 in the construction of the mounting plates and the manner of mounting the handles and jaws on the mounting plates. In the embodiment of FIGS. 20 to 23, the mounting plates 80 and 88 have two apertures 81 adjacent the handle end of the plates for pivotally mounting the handles 79 and two apertures 82 adjacent the opposite end for pivotally mounting the jaws 78 thereon. The handles 79 have through pins 87 press fitted in apertures 86, the pins 87 extending beyond the opposite faces of the handles 79 and through the apertures 81 and 105 in the plates 80 and 88. Similarly the jaws 78 have pins 103 press fitted in apertures 104 therein and extending beyond the opposite faces of the jaws 78 and through the apertures 82 and 90 in the plates 80 and 88. A removable screw 85 extends though an aperture 83 in the plate 80 and into an aligned tapped aperture 106 in the plate 88 to hold the plates in assembled relation. The head 84 of the screw 85 has a socket for receiving an Allen wrench to facilitate tightening and removal of the screw 85. It will be appreciated that in this embodiment the jaws 78 pivot about the axis of the pins 103. The jaws 78 are arcuately recessed at 89 to prevent interference with the screw 85.

In this embodiment the jaws 78 may also be readily replaced by a similarly mounted pair of jaws having the same or a different cutting edge construction by simply removing the screw 85. This enables one or both of the plates to be removed so that the pair of jaws 78 may be changed for another pair.

FIGS. 24 and 25 illustrate another embodiment of the invention which is similar to the one just described and illustrated in FIGS. 20 to 23. It differs therefrom only in that in place of the pins 87 and 103 it uses screws 91 which both pivotally mount the handles and jaws on the mounting plates 80' 88' and also hold the plates in assembled relation. Accordingly, no separate screw for this latter function, corresponding to the screw 85, is required. It will be noted that in this embodiment when replacing the jaws the plates may remain assembled with the handles, as in the embodiments illustrated in FIGS. 1 to 16 and that only the two screws 91 extending through the jaws need be removed.

FIG. 26 illustrates another pair of jaws 94 for both cutting and crimping leads 97 of an electronic component 98 to mount it on the printed circuit board 100. This pair of jaws 94 has a cutting edge 95 and a crimping section 96 for providing a flattened end 99 on the cut lead 97 to hold the component 98 and the leads 97 in place prior to soldering.

It will be appreciated that the various jaws illustrated and described herein are representative only of the many variations of jaw constructions which may be used in the pliers and kit of the present invention.

While only certain specific embodiments of the present invention have been illustrated and described herein, it will be readily appreciated by those skilled in the art that numerous modifications and changes may be made without departing from the scope of the present invention as set out in the appended claims.

I claim:

1. A compound pivot, pliers-type tool having readily replaceable jaws comprising a pair of handles, a pair of parallel spaced mounting plates, means mounting said handles between said plates for pivotal movement about spaced parallel axes perpendicular to said plates, a pair of jaws each having a mounting portion extending between said plates and a work performing portion extending outwardly beyond said plates, each said mounting portion having one of a pair of arcuate grooves formed in a surface thereof adjacent one of said plates, means mounting said jaws between said plates for pivotal movement relative to said plates and holding said jaws and plates in assembled relation, said means mounting said jaws including readily removable fastening means extending between said plates and only a single frangible ring removably located in said pair of arcuate grooves, the removal of said fastening means allowing removal of said ring and said jaws from said tool, and cooperating engaging means on said handles and on said jaws for operating said jaws in response to movement of said handles, the tension strength of said ring being such that, in use, said ring will fail before sufficient closing force is applied to said jaws to break one of said jaws.

2. A compound pivot, pliers-type tool kit comprising a pair of handles, a pair of spaced mounting plates, means mounting said handles between said plates adjacent one end thereof for pivotal movement about spaced parallel axes perpendicular to said plates, a plurality of pairs of jaws, each of said pairs having mounting portions and work performing portions and the mounting portions of each pair being similar so that the pairs may be selectively mounted between said plates, each of said mounting portions having an arcuate groove formed therein in one surface thereof, means for selectively mounting said pairs of jaws between said plates for pivotal movement of each jaw thereof relative to said plates and holding the selected pair of jaws and said plates in assembled relation, said means for selectively mounting said pairs of jaws including readily removable fastening means removable to permit easy replacement of said jaws and only a single removable ring, said arcuate groove of one of said pair of jaws and said arcuate groove of the other of said pair of jaws being adapted to receive said ring, each of said pairs of jaws having force applying means on the mounting portions thereof, and cooperating force applying means on said handles for engaging the force applying means of the selected pair of jaws for operating said jaws in response to movement of said handles, said ring being frangible and adapted to break before one of said jaws in response to excessive force on said force applying means.

3. A tool as defined in claim 1 wherein said handles are fixedly pivotally attached to said plates and said plates and said handles comprise a subassembly defining a jaw recess between said plates for receiving said jaws, whereby removal of said means mounting said jaws leaves said subassembly assembled.

4. A tool as defined in claim 3 wherein said arcuate grooves and said ring are of square cross section.

5. A tool as defined in claim 4 wherein said plates have aligned openings, the opening in one of said plates being tapped and said removable fastening means consists of a screw extending through the other of said plates and threadably received in said aligned tapped opening in said one of said plates.

6. A tool as defined in claim 3 wherein said jaws have overlapping portions having aligned apertures therein and wherein said removable means include a member extending through said aligned apertures.

7. A tool as defined in claim 6 wherein said overlapping portions on closing movement of said jaws transmit shear loads to said member extending through said aligned apertures have cooperating cylindrical surfaces controlling pivotal movement of said jaws relative to each other about said member.

8. A tool as defined in claim 7 wherein said removable means consists of a headed member extending through the aligned opening in the other of said plates and threadedly received in said aligned tapped opening in said one of said plates.

9. A tool as defined in claim 1 wherein said plates each have a pair of apertures adjacent said handles and a pair of apertures adjacent said jaws, wherein said means mounting said handles on said plates includes members individual to said handles extending therethrough and through aligned ones of said pairs of apertures adjacent said handles, and wherein said means mounting said jaws on said plates includes members individual to said jaws extending therethrough and through aligned ones of said pairs of apertures adjacent said jaws.

10. A tool as defined in claim 9 wherein said members are pins fixed in said handles and jaws and wherein said removable means comprises a headed member extending through one of said plates and threadedly engaging the other of said plates.

11. A tool as defined in claim 10 wherein said pairs of apertures in one of said plates are threaded and each of said members has a head which engages the other of said plates and a threaded portion received in one of said threaded apertures in said one of said plates.

* * * * *